US009232246B2

(12) United States Patent
Kotecha et al.

(10) Patent No.: US 9,232,246 B2
(45) Date of Patent: Jan. 5, 2016

(54) DYNAMIC SPLITTING OF EVOLVED MULTICAST BROADCAST MULTIMEDIA SERVICE (EMBMS)

(71) Applicants: Verizon Patent and Licensing Inc., Basking Ridge, NJ (US); Cellco Partnership, Basking Ridge, NJ (US)

(72) Inventors: Lalit R. Kotecha, San Ramon, CA (US); Arda Aksu, Martinez, CA (US); Yee Sin Chan, San Jose, CA (US); Steven R. Rados, Danville, CA (US); David Chiang, Fremont, CA (US); Thomas W. Haynes, San Ramon, CA (US); Jyothi Keshavdas, Pleasanton, CA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 67 days.

(21) Appl. No.: 13/955,677

(22) Filed: Jul. 31, 2013

(65) Prior Publication Data

US 2015/0040162 A1 Feb. 5, 2015

(51) Int. Cl.
*H04N 7/173* (2011.01)
*H04N 21/24* (2011.01)
*H04N 21/266* (2011.01)
*H04N 21/6405* (2011.01)
*H04N 21/6408* (2011.01)
*H04N 21/658* (2011.01)

(52) U.S. Cl.
CPC ......... *H04N 21/2402* (2013.01); *H04N 21/266* (2013.01); *H04N 21/6405* (2013.01); *H04N 21/6408* (2013.01); *H04N 21/6582* (2013.01)

(58) Field of Classification Search
CPC .................. H04N 21/25883; H04N 21/25891; H04N 21/4135; H04N 21/41407; H04N 21/422; H04N 21/44222; H04N 21/4661; H04N 21/4667; H04N 21/4755; H04N 21/4756; H04N 21/478; H04N 21/4821; H04N 21/4825; H04N 21/2402; H04N 21/266; H04N 21/6405; H04N 21/6408; H04N 21/6582
USPC .......................................................... 725/46
See application file for complete search history.

(56) References Cited

U.S. PATENT DOCUMENTS

| 8,473,984 B1 * | 6/2013 | Harmon et al. ................. 725/46 |
| 2004/0088729 A1 * | 5/2004 | Petrovic et al. ................. 725/91 |
| 2010/0154003 A1 * | 6/2010 | Bi et al. .......................... 725/46 |
| 2013/0078925 A1 | 3/2013 | Aguirre et al. |
| 2013/0104173 A1 | 4/2013 | Tjio et al. |

* cited by examiner

*Primary Examiner* — Pankaj Kumar
*Assistant Examiner* — Alazar Tilahun (57) ABSTRACT

A reporting server receives reports on unicast and/or broadcast multimedia content items being accessed by respective user equipment (UE) devices through a network. The reporting server determines, for each multimedia content item, a number of UE devices that are accessing the multimedia content item and whether it is being unicast or broadcast. The reporting server ranks the multimedia content items by the number of UE devices accessing each item. In several disclosed examples, a broadcast video provisioning system switches unicast transmissions to broadcast transmissions based on the ranked list, based on this ranking and possibly on the available unicast and broadcast bandwidth.

18 Claims, 8 Drawing Sheets

DYNAMIC SPLITTING OF EVOLVED MULTICAST BROADCAST MULTIMEDIA SERVICE (EMBMS)

BACKGROUND

Electronic programming may include multimedia content that is either unicast or broadcast to mobile devices in a particular geographic area, using one or more channels in a wireless network. In a sporting venue, for example, many viewers may want to watch television coverage of the game being played to be able to see additional content, such as another camera angle or the game broadcast of a rival team, which is not available to those actually attending the event. This content may be broadcast or multicast to the viewers who want to watch it in a single channel, allowing the remaining bandwidth to be used for telephone calls or for unicast transmissions to individual attendees.

DETAILED DESCRIPTION OF PREFERRED EMBODIMENTS

The following detailed description refers to the accompanying drawings. The same labels and/or reference numbers in different drawings may identify the same or similar elements.

In one or more implementations, devices may be used to control the delivery of multimedia content, including audio, video and data to user equipment (UE) devices in a wireless network.

Figure 1:
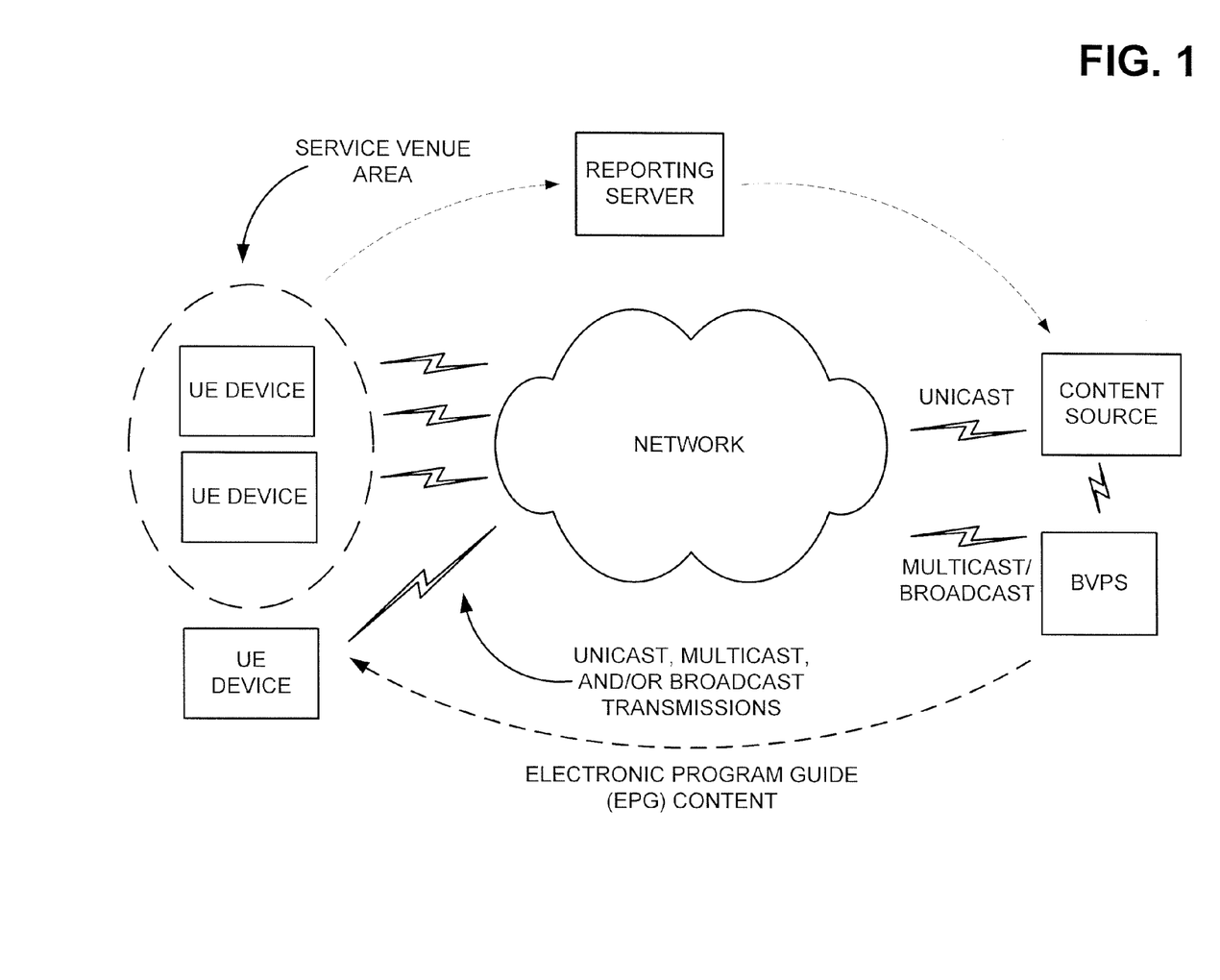
FIG. 1 is a block diagram of an example overview of an implementation described herein.

FIG. 1 is a diagram of an example providing an overview of an implementation described herein. A content source may provide multimedia content to be sent to the UE devices by broadcast, multicast or unicast. A unicast content stream is sent to a single UE device. A broadcast stream is sent so that it may be received by any of the UE devices. A multicast stream is sent to selected UE devices while other UE devices are excluded from receiving the stream. In the materials that follow, references to "broadcast," "broadcast transmission" or "broadcast services" also include multicast. The unicast content is provided through the packet data network gateway and the service gateway of the network. The broadcast multimedia content is provided via a broadcast video provisioning system (BVPS) server. The BVPS and the reporting server may also monitor the number of UE devices that are receiving each content element, monitor network conditions corresponding to the network (e.g., network congestion, network resources, dates and times, whether the UE devices are located within a service venue area (e.g., a stadium, an amusement park, etc.), the number of UE devices within the service venue area, etc.). The BVPS server may also, or alternatively, determine, based on the network conditions and data provided by the reporting server, whether to provide a particular content item to one or more of the UE devices as a broadcast transmission or to allow the content to be provided by unicast. The BVPS server may also indicate the content that is currently being provided as well as content that may be of interest to customers in the service venue using an electronic program guide (EPG) broadcast to all of the UE devices.

In some implementations, UE devices outside of the service venue area may receive multimedia content via unicast transmission services and UE devices inside the service venue area may receive the content item via broadcast transmission services. In some implementations, whether a particular UE device receives content via unicast or broadcast transmission services may depend on a number of devices connected to the network that are interested in receiving content. In such implementations, a reporting server may keep track of the number of UE devices in the service area that are accessing or want to access each content element listed in the EPG. In certain implementations, a UE device inside of the service venue area may receive multimedia content via unicast transmission services if sufficient unicast bandwidth is available and if the number of UE devices requesting or viewing the content is less than a minimum threshold value.

Accordingly, the BVPS server may optimize multimedia content delivery by using different types of transmission services, depending on network conditions and demand. For example, in an implementation where a first portion of the radio frequency bandwidth of an eNodeB type base station is reserved for unicast transmission services and a second portion is reserved for broadcast transmission services, the BVPS server may adjust the percentage of bandwidth to be used to broadcast content. If a number of UE devices have requested content that is currently being unicast and the number is greater than a threshold, the BVPS server may cause the content to be transmitted to the UE devices using broadcast transmission services. Accordingly, the capability of the BVPS server to work with varying network conditions, multiple radio frequency bands, and multiple transmission services may enable the BVPS server to optimize the delivery of content to the UE devices. The operation and structure of an example BVPS that may be adapted for use in in the example implementations is described in copending U.S. patent application Ser. No. 13/280,816 entitled "BROADCAST VIDEO PROVISIONING SYSTEM" filed Oct. 25, 2011, the contents of which are incorporated herein by reference.

The terms "multimedia content," "content," "content item" and "content element" as used herein, are used interchangeably and may include any variety or combination of audio, video and data programming. Examples include: camera feeds, audio commentary, web content, text, music, concerts, radio programs, television programs, videos, shows, movies and/or one or more other types of media-based programming.

Figure 2:
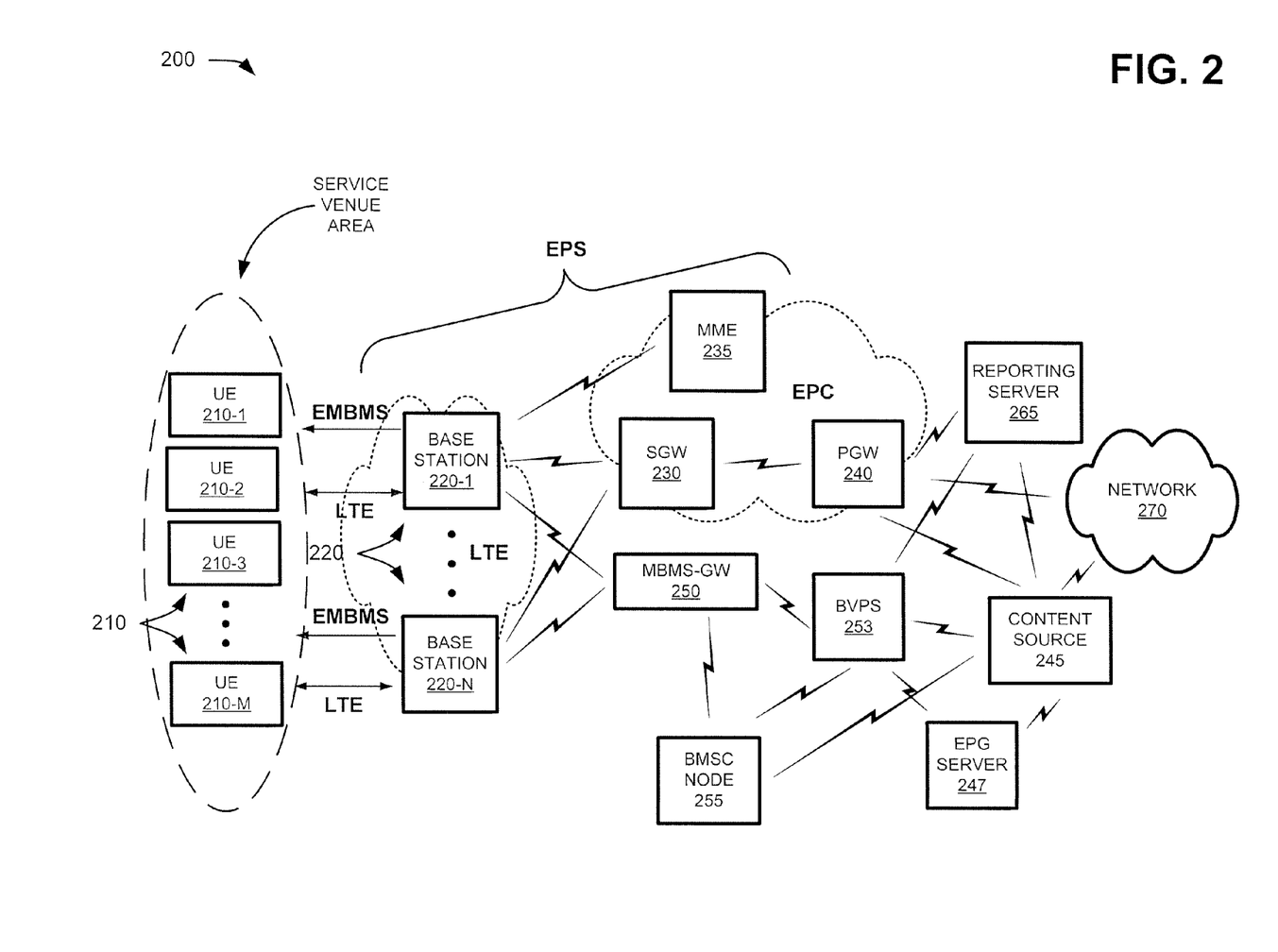
FIG. 2 is a functional block diagram of an example of an environment in which systems and/or methods, described herein, may be implemented.

FIG. 2 is a diagram of an example environment 200 in which systems and/or methods described herein may be implemented. As shown in FIG. 2, environment 200 may include multiple UE devices 210-1, 210-2, 210-3, . . . , 210-M (where M≥1) (referred to collectively herein as UE devices 210 and individually as UE device 210), a group of base stations 220-1, . . . , 220-N (where N≥1) (referred to collectively herein as "base stations 220" and individually as "base station 220"), a serving gateway 230 (hereinafter referred to as "SGW 230"), a mobility management entity device 235 (hereinafter referred to as "MME 235"), a packet data network (PDN) gateway (PGW) 240, EPG server 247, multicast broadcast multimedia service gateway (MBMS-GW) 250, broadcast multicast service control (BMSC) 255, a reporting server 265, a broadcast video provisioning system (BVPS) 253, a content source 245, and a network 270. The number of devices and/or networks, illustrated in FIG. 2, is provided for explanatory purposes only. In practice, there may be additional devices and/or networks, fewer devices and/or networks, different devices and/or networks, or differently arranged devices and/or networks than illustrated in FIG. 2.

Unicast connections are established using the SGW 230 and PGW 240. Broadcast and multicast connections are established using the BVPS 253, BMSC node 255 and MBMS-GW 250. The base stations 220 are used for both unicast and broadcast transmission services. Telephone calls are handled through standard telecommunications channels (not shown). For a given base station 220, any bandwidth that is not used for the telecommunications channels is available to provide unicast or broadcast transmissions.

Also, in some implementations, one or more of the devices of environment 200 may perform one or more functions described as being performed by another one or more of the devices of environment 200. Devices of environment 200 may interconnect via wired connections, optical connections, wireless connections, or a combination of wired, optical and wireless connections.

Implementations are described as being performed within a radio access network (RAN) that is based on a long term evolution (LTE) network for explanatory purposes. In other implementations, the implementations may be performed within a RAN that is not based on a LTE network.

Environment 200 may include an evolved packet system (EPS) that includes a LTE network and/or an evolved packet core (EPC) that operate based on a third generation partnership project (3GPP) wireless communication standard. The LTE network may be a RAN that includes one or more base stations 220 that take the form of evolved Node Bs (eNBs) via which UE devices 210 communicate with the EPC. The EPC may include SGW 230, MME 235, and/or PGW 240 that enable UE devices 210 to communicate with network 270 and/or an Internet protocol (IP) multimedia subsystem (IMS) core (not shown).

UE device 210 may include any computation or communication device, such as a wireless mobile communication device that is capable of communicating with base station 220 and/or a network (e.g., network 270). Examples of the UE device 210 include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. UE device 210 may send traffic to and/or receive traffic from network 270. The UE devices are programmed with applications (Apps) that access content from the network. An example UE device 210 may have multiple Apps running at a given time and, thus, may access multiple unicast, multicast and broadcast streams.

Base station 220 may include one or more devices that receive, process, and/or transmit traffic, such as audio, video, text, and/or other data, destined for and/or received from a UE device 210. In an example implementation, base station 220 may be an eNB associated with the LTE network that receives traffic from and/or sends traffic to network 270, reporting server 265 and BVPS 253. Communication with the reporting server 265 and the EPG server 247 is unicast via the SGW 230 and PGW 240. Communication with the BVPS is via the MBMS-GW as controlled by the BMSC node 255. Base station 220 may send traffic to and/or receive traffic from UE device 210 via an air interface. In another example, one or more other base stations 220 may be associated with a RAN that is not associated with the LTE network.

SGW 230 may include one or more computation or communication devices that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 230 may aggregate traffic received from one or more base stations 220 associated with the LTE network, and may send the aggregated traffic to network 270 (e.g., via PGW 240) and/or other network devices associated with the EPC. SGW 230 may also receive traffic from the other network devices and/or may send the received traffic to UE device 210 via base station 220. SGW 230 may perform operations associated with handing off UE device 210 from and/or to the LTE network.

MME 235 may include one or more computation or communication devices that gather, process, search, store, and/or provide information in a manner described herein. For example, MME 235 may perform operations associated with handing off UE device 210, from a first base station 220 to a second base station 220, when UE device 210 is exiting a cell associated with the first base station 220 or when the first base station may better serve the UE device 210 than the second base station. MME 235 may, in yet another example, perform an operation to handoff a UE device 210 from the second base station 220 to the first base station 220 when the UE device 210 is entering the cell associated with first base station 220.

PGW 240 may include one or more computation or communication devices that gather, process, search, store, and/or provide information in a manner described herein. PGW 240 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 240 may include a device that aggregates traffic received from one or more SGWs 230, etc. and may send the aggregated traffic to network 270. In another example implementation, PGW 240 may receive traffic from network 270 and may send the traffic toward one of the UE devices 210 via SGW 230.

The EPG server 247 provides program guide information about available multimedia content items to UE devices 210, for presentation to users of the devices 210, for example, to allow users to select content items of interest. The EPG server 247 may include one or more of a variety of computing devices. For example, EPG server 247 may include a server, a cluster of servers, or one or more other types of computing or communication devices. EPG server 247 may store, or otherwise have access to, data corresponding to one or more versions of one or more EPGs indicating content that is currently available for viewing by the UE devices 210. EPG server 247 may receive data indicating the current multicast and broadcast content available via content source 245 and BVPS 253 and the current unicast content available via content source 245 and PGW 240 and SGW 230. EPG content may include any variety or combination of information relating to available media-based programs. For instance, EPG content may include program titles, program descriptions, program statistics (e.g., the number of times a video or program has been accessed), program ratings, program reviews, program broadcast dates, program broadcast times, program broadcast channels, images, videos, and/or other types of information relating to programs communicated to UE device 210. The EPG data may be provided to BVPS as one or more content items that may be broadcast to the UE devices 210, in a manner similar to broadcast of other multimedia content items through the environment 200. This content may be updated periodically, for example, every five minutes, or when the reporting server 265 determines that the EPG content should be changed.

The BVPS 253 and the BMSC node 255 may periodically cause the EPG to be broadcast to all of the UE devices 210. The EPG may be broadcast every five minutes. Alternatively, the BVPS may monitor multicast and broadcast traffic so that the EPG data is sent at irregular intervals when there is sufficient broadcast bandwidth. In addition or alternatively, any UE device 210 may send a unicast request to the EPG server 247 for a current copy of the EPG. In response, the EPG server causes the EPG data to be sent in a unicast response to the requesting UE device via the PGW 240 and SGW 230. The example EPG indicates all multimedia content that is currently being accessed, whether by unicast, multicast or broadcast. In addition, the EPG may indicate content that is not currently being accessed but that is available for access.

Reporting server 265 may include one or more of a variety of computing devices. For example, reporting server 265 may include a server, a cluster of servers, or one or more other types of computing or communication devices. Reporting server 265 may receive and store, or otherwise have access to, reports and/or survey results provided by the UE devices 210 indicating programming that they are accessing or would like to access. In an example, the reporting server 265, using information in the reports and/or survey results, is configured to process item access statistics to determine, for each multimedia content item, the number of UE devices 210 that are accessing the multimedia content item and whether the content item is being accessed by unicast or is being broadcast to UE devices 210. Reporting server 265 may also, or alternatively, monitor network conditions corresponding to UE devices 210 and/or, one or more devices of the LTE network or the EPC network. As mentioned above, examples of network conditions may include available bandwidth through one or more of the base stations 220 serving the venue area, a level of network activity, a level of network congestion, a period of time corresponding to peak network usage hours, a period of time corresponding to off-peak network usage hours, a location of UE device 210 relative to the service venue area, etc. In one implementation, the functions of the EPG server 247 may be performed by the reporting server 265.

MBMS-GW 250 may include one or more computation or communication devices that gather, process, search, store, and/or provide information in a manner described herein. MBMS-GW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. For example, MBMS-GW 250 may provide connectivity between one or more base stations 220 and other network devices (e.g., BMSC node 255) for broadcasting and/or multicasting programming content, EPG content, or other types of data to UE devices 210. For instance, in some implementations, MBMS-GW 250 may include a device that aggregates traffic received from one or more BMSC nodes 255 and may send the aggregated traffic to one or more base stations 220 for broadcasting and/or multicasting.

BMSC node 255 may include one or more computation or communication devices that gather, process, search, store, and/or provide information in a manner described herein. BMSC node 255 may receive content from BVPS 253 and format the content for broadcasting and/or multicasting the content to UE devices 210 via MBMS-GW 250 and one or more base stations 220. In another example, BMSC node 255 may retrieve programming content and/or other types of content from network 270 (e.g., a content delivery network (CDN)), format the programming content for broadcasting and/or multicasting, and provide the content to one or more base stations 220 for delivery to UE devices 210. Additionally, or alternatively, BMSC node 255 may provide other services, such as digital rights management (DRM) services, relating to content, provided to UE devices 210.

BVPS 253 may include one or more computation and/or communication devices, that gather, process, and/or provide information in a manner described herein. For example, BVPS 253 may include a server device, a workstation computer, a network device, etc. In an example implementation, BVPS 253 may receive information associated with the event taking place in the service venue area and may assign an event identifier to the event based on the event information. BVPS 253 may provide the event identifier to BMSC node 255 located at the event location, and may determine an amount of cell capacity of the base stations 220 serving the event location that is available for broadcast transmissions. A content source 245 may capture, for broadcast or unicast, the live event data and provide the data that is to be broadcast to the BVPS 253 while providing the data that is to be unicast to the PGW 240. Content source 245 also receives content from network 270. It may also have prestored content, for example non-event related content, such as movies, for delivery to the UE devices 210. Based on the event information. BMSC 255 may cause the live event data from the BVPS 253 to be broadcast to the UE devices 210, at the event location, when UE devices 210 request the live event data. BVPS 253 may include a centralized system that is responsible for communicating eMBMS session information with one or more BMSC nodes 255. BVPS 253 may utilize appropriate interfaces and parameters to seamlessly create broadcast sessions with minimal impact to network traffic and while optimizing customers' quality of experience.

In one example implementation, BVPS 253 also instructs the base stations 220 to reserve bandwidth at the event location by issuing commands (e.g., a START event command), which may result in a set of control signaling of the event through BMSC node 255, MBMS-GW 250, MME 235, and base station 220. The control signaling may trigger base station 220 to create a dedicated bearer (e.g., a guaranteed bit rate bearer) with a quality of service class indicator (QCI). This process may be repeated for each item of multimedia content to be delivered through the base stations 220.

Additionally, or alternatively, BVPS 253 may analyze network conditions and determine how content should be transmitted to UE devices 210. For example, BVPS 253 may decide whether the content should be transmitted to UE device 210 via a multicast transmission service or a broadcast transmission service. In some implementations, the transmission services may be allocated to one or more radio frequency bands.

In one implementation, one radio frequency band may be dedicated to broadcast content, while another radio frequency band is dedicated to unicast content. In such examples, the BVPS 253 analyzes many factors, including the current network conditions, the current levels of unicast and broadcast content, the number of users accessing each item of content, to determine percentage of the band that can be used for broadcast transmissions that allow the largest number of users in the service venue area to access their desired content. The total frequency band may be either 10 MHz or 20 MHz and as much as 60 percent of the frequency band may be used for broadcast transmissions.

Network 270 may include one or more wired and/or wireless networks. For example, network 270 may include a cellular network, a public land mobile network (PLMN), a second generation (2G) network, a third generation (3G) network, a fourth generation (4G) network, a fifth generation (5G) network, and/or another network. Additionally, or alternatively, network 270 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks. The network 270 may be accessed by the UE devices via the PGW 240. It is also accessed by the content source 245 to obtain web content to be broadcast to the UE devices 210.

While implementations described herein are described primarily in the context of broadband services via LTE, other wireless standards may be used. For example, components conforming to LTE standards described herein may be replaced by components conforming to other network standards (e.g., GSM, WCDMA, UMB, UMTS, CDMA2000, HSPA, 802.11, or other network standards).

Figure 3:
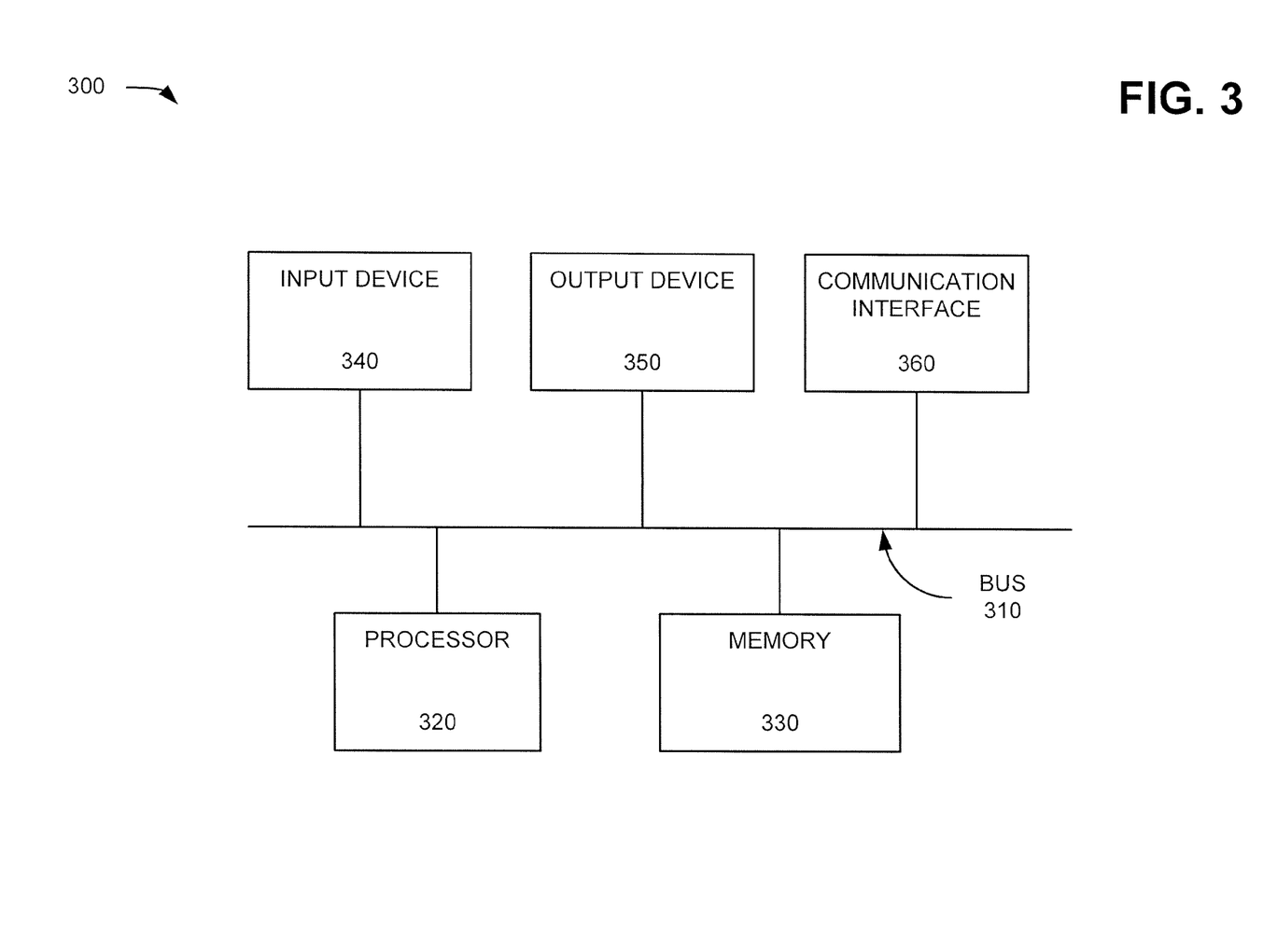
FIG. 3 is a block diagram of example components of a device that may be utilized in the environment of FIG. 2.

FIG. 3 is a diagram of example components of a device 300 according to one or more implementations described herein. In certain implementations, device 300 may correspond to one or more of the devices depicted in FIG. 2. For example, device 300 may correspond to UE device 210, SGW 230, MME 235, PGW 240, content source 245, EPG server 247, MBMS-GW 250, BMSC node 255 or reporting server 265. Additionally, each of UE device 210, SGW 230, PGW 240, video source 245, EPG server 247, MME 235, MBMS-GW 250, BMSC node 255 or reporting server 265 may include one or more devices 300 or one or more components of device 300.

As depicted, device 300 may include bus 310, processor 320, memory 330, input device 340, output device 350, and communication interface 360. However, in other implementations, device 300 may include fewer components, additional components, different components, or differently arranged components than those illustrated in FIG. 3.

Bus 310 may include one or more component subsystems and/or communication paths that enable communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system, and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type optical, wireless or wired interface. Communication interface 330 may also include an antenna (or a set of antennas) that permit wireless communication, such as the transmission and reception of radio frequency (RF) signals in accordance with the applicable standard for wireless communications with the base station 220.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
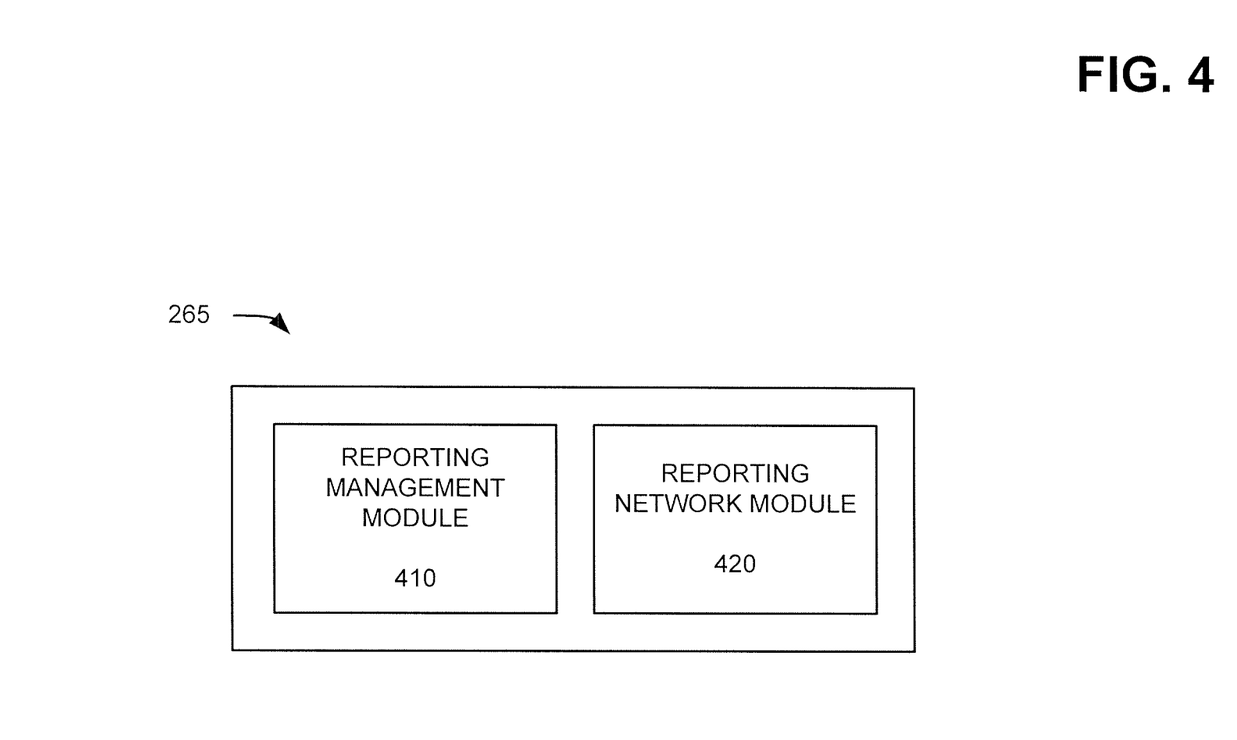
FIG. 4 is a block diagram of example showing functional components of a reporting server according to one or more implementations described herein.

FIG. 4 is a diagram of example functional components of reporting server 265 according to one or more implementations described herein. As illustrated, the example of a reporting server 265 includes a reporting management module 410 and a reporting network module 420. Depending on the implementation, one or more of the modules 410-420 may be implemented as a combination of hardware and software based on the components illustrated and described with respect to FIG. 3. Alternatively, modules 410-420 may each be implemented as hardware based on the components illustrated and described with respect to FIG. 3.

Reporting management module 410 may provide functionality with respect to managing reports and/or survey responses received from the UE devices 210. For example, the reporting management module 410 may enable reporting server 245 to query the UE devices as to what content they are currently accessing, how it is being accessed (e.g. unicast or broadcast) and what content the user would like to access. The reporting management module also enables reporting server 245 to send surveys to the UE devices 210 and to receive reports and/or survey responses from the UE devices 210. The surveys sent to the UE devices 210 may ask the users to rate different content currently listed in the EPG. As described below, this information may be used to determine which content is to be unicast or broadcast and to determine any additional content that should be listed in the EPG as being available to be unicast or broadcast.

Reporting network module 420 may provide functionality with respect to communicating the results of the reports from the UE devices 210. For example, reporting network module 420 may enable reporting server 265 to transmit a query to a particular UE device 210 and then to receive the response to that query. The reporting network module 420 may also monitor current network conditions. In some implementations, the network conditions may include a level of network congestion corresponding to an access network of the network or another portion of the network. As mentioned above, additional examples of network conditions may include a period of time corresponding to the network (e.g., a period of time corresponding to peak network usage hours, a period of time corresponding to off-peak network usage hours, etc.), a location of a UE device 210 relative to a service venue area, or another type of condition relating to the network and/or UE device 210.

Reporting network module 420 may also, or alternatively, enable reporting server 265 to determine whether to recommend providing an item of content as a unicast or broadcast transmission. In some implementations, this determination is based on one or more factors, such as a number of UE devices 210 currently accessing a multimedia content item, a number that want to access the content item, a level of perceived quality of the content item, a level of network congestion corresponding to the network or another type of network condition corresponding to the network.

Reporting network module 420 may also, or alternatively, enable reporting server 265 to optimize the delivery of content by, for example, causing the content source 245 to use unicast services to deliver all multimedia content to UE devices when network congestion is low, and, when network congestion is high, cause the BVPS 253 to use broadcast services to deliver all multimedia content to UE devices 210.

In addition to the functionality described above, functional components of reporting server 265 may also, or alternatively, provide functionality as described elsewhere in this specification. While FIG. 4 shows a particular number and arrangement of modules, in alternative implementations, reporting server 245 may include additional modules, fewer modules, different modules, or differently arranged modules than those depicted.

Figure 5:
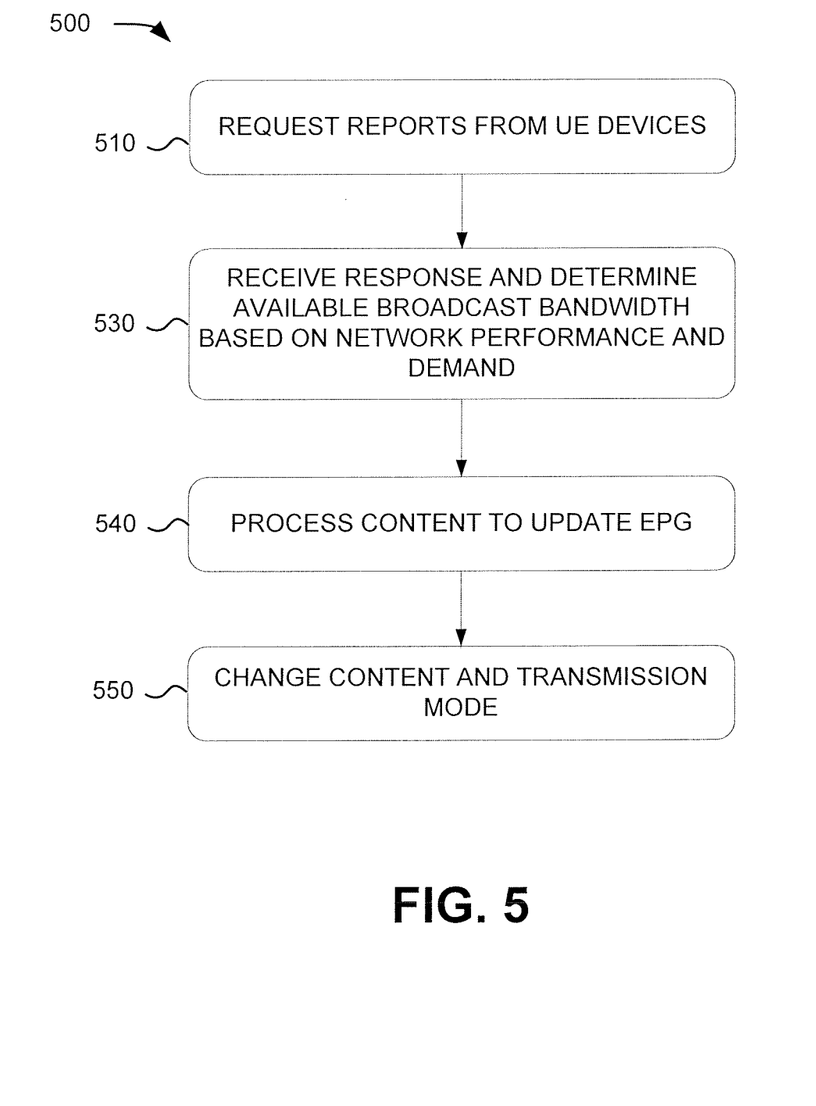
FIGS. 5 and 6 are flow-chart diagrams of examples of processes executed by the reporting server to control evolved multicast broadcast multimedia service (EMBMS) transmissions according to one or more implementations described herein.

FIG. 5 is a flow chart of an example process 500 that runs on reporting server 265 according to one or more implementations described herein. In one or more implementations, process 500 may be performed by one or more components of reporting server 265. In other implementations, one or more blocks of process 500 may be performed by one or more other components/devices, or a group of components/devices, including or excluding reporting server 265.

In this example, the reporting server 265 requests reports of accessed content from one or more of the UE devices 210 (block 510). For example, reporting server 265 may send unicast requests to each of the UE devices 210-1 through 210-N in sequence. It may then receive unicast responses from each of the UE devices. Alternatively, the reporting server 265 may broadcast a request for reports to all of the UE devices 210. The broadcast request may be a separate event or it may be combined with the delivery of the EPG data such that, when the UE device 210 receives the EPG data it responds with a report. When the requests are broadcast, each UE device sends its report as a unicast response with a random delay to avoid collisions with replies from other UE devices. A value for the delay may be generated by applying a hash function to the reply data. In this example, each reply is sent as a unicast message from the UE device 210 to the base station 220 and ultimately to the reporting server 265. To conserve bandwidth, the reports may be compressed before they are sent to the base stations 220, for example by sending a sequence of bits, each corresponding to a respective EPG entry where a "1" indicates that a UE device is accessing or wants to access the multimedia content item and a "0" indicates no access.

The request sent by the reporting server 265 to the UE devices 210 may or may not be displayed to the user. If it is not displayed, the UE device that receives the request automatically responds with an indication of the content it is currently accessing as well as content in the EPG that it would like to access. If the request is displayed to the user, it may include a survey form asking for ratings on the content that the user is accessing. In the example, the survey response is optional.

In one implementation, a survey may be used to initially determine what content is broadcast to the UE devices 210. The EPG sent to the UE devices 210 may list several multimedia content items that are available and the survey will ask the users to vote for one or more of the items. Depending on the available bandwidth, the BVPS may select the one or more items receiving the highest number of votes and broadcast these selections to all of the UE devices 210. Alternatively, if the selected content requires a payment, the BVPS may multicast the content selection only to the UE devices that voted to receive it.

If the service venue is a stadium where a sporting event, for example a football game, is being played, the EPG may include game-related items such as the video feed and commentary that is being provided for terrestrial or cable television broadcast or individual raw feeds from the cameras covering the game. The content may be audio, video, text or web content. For example, users may want to listen to the commercially broadcast commentary while watching the game live. The EPG may also include broadcast feeds from other games, for example, games being played by rival teams. Alternatively, content related to the rival team may be via a lower-bandwidth service such as audio, text, HTML or XML. The EPG may also include content that is not game-related, such as videos or movies, for example, to keep children entertained. The ratio of non-game-related content to game-related content may be changed dynamically during the game, such that more non-game-related content is offered during halftime, for example. In addition, more non-game-related content may be offered if the EPG requests indicate an increase in demand for non-game-related content. The timing of when to provide the content may be a part of the event description or may be determined dynamically based on user demand. Thus the EPG, which serves a limited area and UEs essentially located within the limited area, may include programming either related to or unrelated to the event in the limited area and that is dependent on timing related to the event, popularity of particular programs, UE feedback, and/or account holder information for each UE, among others.

The reporting server 265 receives the reports and/or survey responses and, in one implementation, may determine how much broadcast bandwidth is available on the base stations 220. The available bandwidth is determined based on the performance of the network and the demand for telecommunication services (block 530). Thus, the available bandwidth is a function of both the amount of content being accessed (both unicast and broadcast) and the quality of service (QoS)

that is available for any unused bandwidth. In this implementation, the reporting server 265 receives information on the available bandwidth from the BMSC node 255. In an example implementation, a base station 220 may have an available bandwidth of 10 MHz for broadcast and unicast transmissions. This bandwidth may be divided so that 5 MHz is reserved for unicast transmissions and 5 MHz is reserved for broadcast transmissions. In this implementation, the bandwidth available transmitting unicast and broadcast multimedia content is the bandwidth of the base station 220 minus any bandwidth consumed by wireless calls.

Next, the reporting server 265 processes the reports and surveys that it received (block 540), as described below with reference to FIG. 6. Finally, the reporting server 265 provides the processed reports and surveys to the BVPS 253 and to the content source 245 to change the mix of content being sent by unicast and broadcast, based on the received responses. Data from the responses may also be provided to the EPG server 247 to change the EPG offerings. Alternatively, the BVPS and content source may instruct the EPG server 247 to change the offered programs based on the data provided by the reporting server 265.

Figure 6:
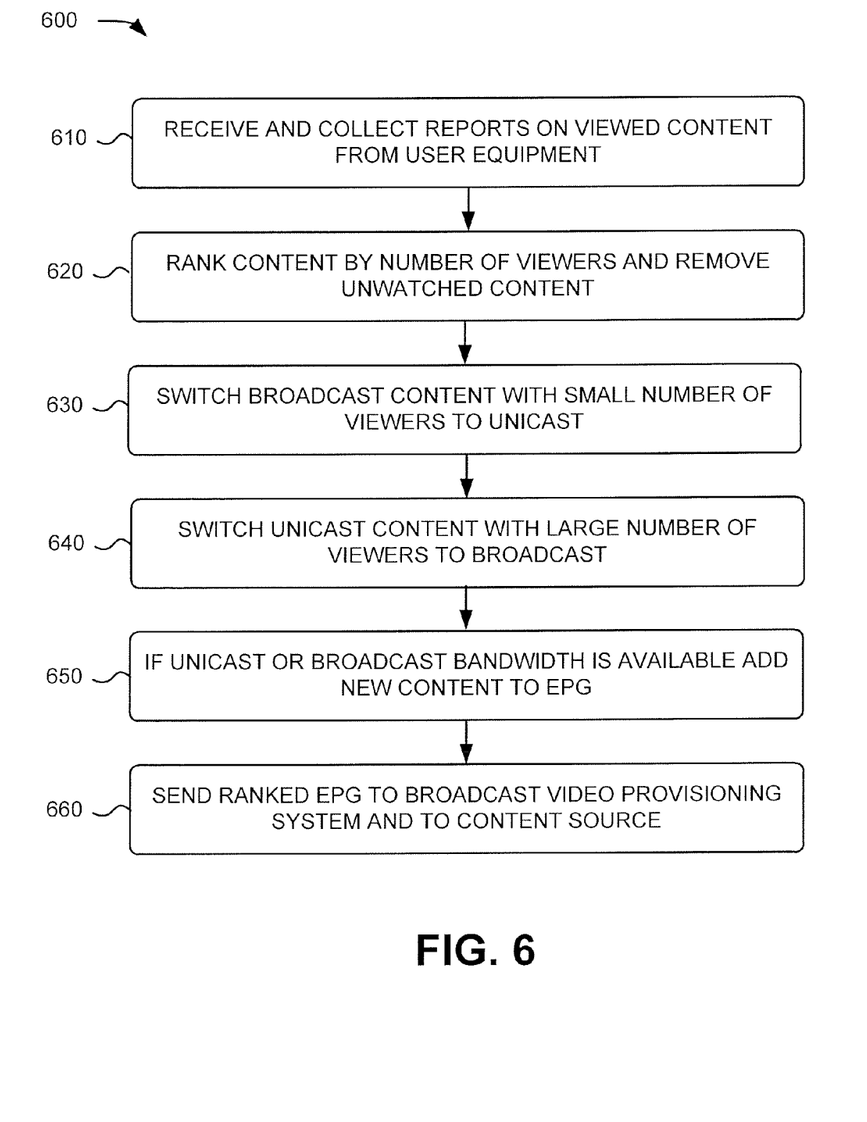

FIG. 6 is a flow-chart diagram of a process 600 performed by the reporting server 265 in processing the reports received from the UE devices 210 as briefly described above with reference to block 530. In an example implementation, the reporting server generates recommendations to change the mix of broadcast and unicast content. The recommendations may be positions of multimedia content items in the ranked list. The changes, however, are made by the BVPS 253 and BMSC node 255. As described above, the reporting server 265 receives and collects the reports and/or the survey responses provided by the UE devices 210-1-210-M (block 610). Next, the process 600 ranks the content that is currently being accessed and the content that the users have indicated that they want to access (block 620). In one implementation, the content may be ranked by the number of users who are accessing it or who have indicated a desire to access it. The content items may be ranked by recording each item in a list and associating each item with a number of UE devices accessing it or that would like to access it. The list may then be sorted based on this number to produce the ranked list. Assuming that larger numbers represent desirability, content items associated with the larger numbers are ranked higher than those with lower numbers.

In another implementation, the survey responses may be used to rank the content items. For example, a survey may ask a user to rate each content item as good, neutral or bad. A first content item receiving bad rating in a threshold number of survey responses may have its ranking reduced by one step while a second content item receiving a good rating from the threshold number of responses may have its ranking increased by one step. It is contemplated that other techniques may be used to modify the rankings based on the survey results.

Additionally, the requests for programs in the EPG may factor into the rankings. For example, if the system is being used in a stadium to augment a game, the scoreboard in the stadium may indicate the score of a game being played by a rival team. This may increase the demand for access to the television feed of the rival team's game. If this game is listed in the EPG, the reporting server may receive an increase in requests to view the game. These requests may be used to place the television feed of the other game higher in the ranking even though it is not currently being broadcast.

In one implementation, the mix of content that is being unicast and broadcast is changed in response to the rankings.

At block 630, if currently broadcast content is being accessed by only a few viewers (e.g. the number of viewers is less than a first threshold value) or if it is receiving low ratings, the reporting server 265 may recommend switching the content from broadcast to unicast. Conversely, at step 640 if content that is currently being unicast is in demand, as indicated by the number of EPG requests (e.g. the number of unicast transmissions and EPG requests is greater than a second threshold value), the server 265 may recommend that the content be switched from unicast to broadcast. To prevent excessive switching, the first threshold value may be less than the second threshold value. The values of the thresholds may be determined empirically (e.g., 10-20% for the first threshold and 20-30% for the second threshold), as may the relative value between the thresholds (e.g., 10% overall UE requests or 25% difference between thresholds).

At block 650, if additional unicast or broadcast bandwidth is available, the reporting server determines whether new content should be added to the EPG. For example, if different camera feeds from the game in progress are ranked high on the list, the EPG server 247 may offer more camera feeds in the EPG. Also if, during halftime, non-game-related content is ranked higher, the EPG server 247 may add more entertainment content to the EPG. This content may replace game related content, for example camera feeds that are not needed during halftime.

If the reporting server determines that it may be desirable to add new content, it may notify the EPG server 247 to add new content to the EPG. In one implementation, the reporting server 265 may send the ranked list with any unicast to broadcast switching recommendations to the BVPS 253 and content source 245 which may then interface with the EPG server 247 to change the EPG content. In another implementation, the reporting server 265 may pass the ranked list to the EPG server 247 so that the EPG server can communicate with the BVPS 253 and content source 245 to determine which content should be added to the EPG.

Alternatively or in addition, the EPG server 247 may add or delete content items from the EPG based on the types of EPG requests that are being received. If for example, there is an increase in requests for non-game-related content, the EPG server 247 may include additional non-game-related content in the EPG that is broadcast to all of the UE devices 210. If a content item is not being accessed by any of the UE devices it may be eliminated from the EPG, either immediately or after a suitable delay, for example a few minutes.

In determining whether additional unicast bandwidth is available, the BVPS 253 and BMSC node 255 may be constrained by the volume of mobile telephone calls. In one implementation, only 60 percent of the bandwidth of the base stations 220 that is not being used for mobile telephone calls may be used for broadcast transmissions. This bandwidth may change dynamically and is monitored by the BVPS and BMSC node 255.

As described above, network conditions may be monitored at block 530 (shown in FIG. 5). Network condition information may be collected by one or more network devices, such as one or more base stations 210, SGW 230, MME 235, PGW 240 and/or one or more other types of network devices, and transmitted to reporting server 265, BVPS 253 or BMSC node 255 for processing. As mentioned above, the network conditions monitored may correspond to one or more of a variety of circumstances relating to the network. For instance, reporting server 265 may monitor a load condition of the network (e.g., a level of network activity, a level of network congestion, etc.), a period of time corresponding to the network (e.g., a period of time corresponding to peak network usage hours, a period of time corresponding to off-peak network usage hours, etc.), a location of UE device 210 relative to a service venue area, or another type of condition relating to the network and/or UE device 210.

A determination may be made whether to provide content using unicast or broadcast services (blocks 630-650). For example, reporting server 265 may consider the network conditions and make a recommendation to provide content to UE devices 210 via unicast transmission services or broadcast transmission services. As described above, reporting server 265 may determine which type of transmission service to use (e.g., unicast services or broadcast services) based on the network conditions monitored and pass recommendations on the services to the BVPS 253.

For example, reporting server 265 may consider a level of network congestion corresponding to one or more networks and/or network devices. Doing so may enable reporting server 265 to determine whether delivery of particular content would be better if a unicast transmission service and/or a broadcast transmission service were used. Similarly, reporting server 265 may consider a geographic location corresponding to one or more UE devices 210 requesting the content. Such a consideration may be made with reference to whether the UE devices are located inside or outside of the service venue area and with reference to which base stations 220 may provide content to the UE devices 210. Doing so may enable reporting server 265 to identify the network resources (e.g., the radio frequency bandwidths, the types of transmission services, processing capacity, etc.) that could be used to respond to the requesting UE device 210. Reporting server 265 may mark each content item in the ranked list with a recommendation based on this analysis. In this example, these markings include move from unicast to broadcast, move from broadcast to unicast, begin broadcasting new content item, delete unicast content item or begin unicast transmission of new content item.

When the reporting server 265 recommends switching content from broadcast to unicast, the BVPS 253 may stop transmitting the item while the content source 254 routes the unicast transmission through the PGW 240 and SGW 230. The BVPS 253 may signal the content source 254 when it is dropping broadcast transmissions of the item so that the content source knows when to establish the unicast transmission (s).

Figure 7:
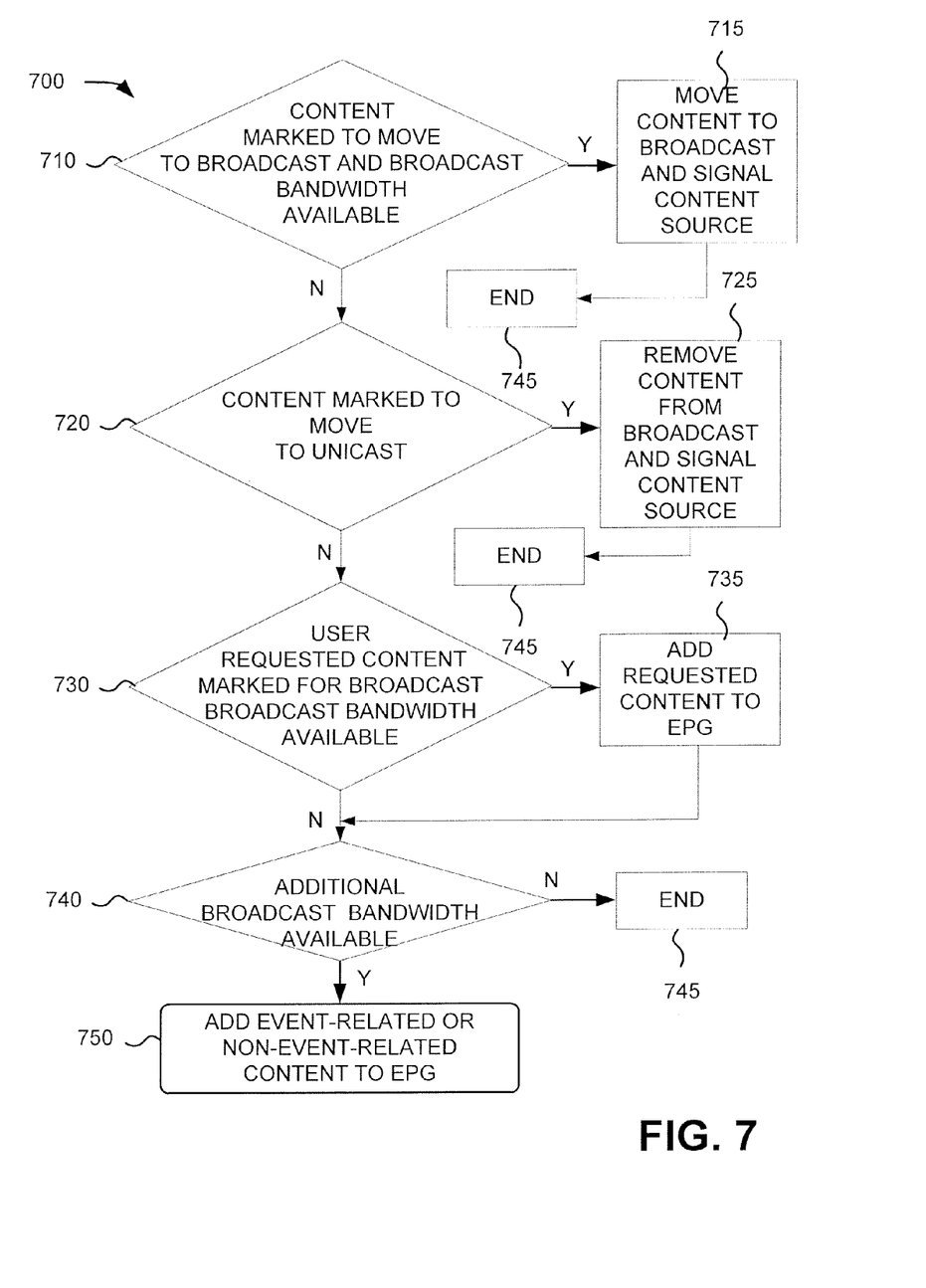
FIG. 7 is a flow-chart diagram of an example process executed by the broadcast video provisioning system (BVPS) in response to data provided by the reporting server.

FIG. 7 is a flow-chart that illustrates the steps of an example process 700 performed by the BVPS 253 on receiving the ranked list from the reporting server 265. Each marked content item in the list is processed based on how it was marked by the reporting server 265. If the reporting server 265 has marked any content to be switched from unicast to broadcast, the BVPS 253 and BMSC node 255 determine if sufficient broadcast bandwidth is available (block 710) and, if it is, starts broadcasting the designated content (block 715). The BVPS 253 also signals the content source 245 to terminate the unicast transmissions of the designated content. To implement this switch, the BMSC node 255 may cause the MBMS-GW 250 and base station 220 to begin transmitting the content in a broadcast channel and signal the content source 245 to cause the PGW 240, SGW 230 and base station 220 that is handling the unicast transmission to terminate it. After block 715, the process terminates for this content item (block 745).

Next, if the reporting server 265 has recommended switching any content item that is currently being broadcast to be unicast, the BVPS stops transmitting the selected content (block 725). To implement this switch, the reporting server 265 notifies the content source 245 to cause the PGW 240, SGW 230 and one of the base stations 220 to begin transmitting the content in a unicast channel and the BVPS 253 causes the MBMS GW 250 and base station 220 to terminate the broadcast transmission. After block 725, the process terminates for this content item (block 745).

If the reporting server indicates that any new broadcast content should be added to the EPG, by marking the content item in the ranked list, the process determines if sufficient broadcast bandwidth is available to accommodate the new content (block 730). If it is, the BVPS 253 notifies the EPG server to add the recommended content (block 735). If, after adding the last recommended content item to the EPG, the process determines that additional broadcast bandwidth is available (block 740), the BVPS determines event-related or non-event-related content to add to the EPG (block 750). If no additional bandwidth is available at block 740, the process terminates at step 745.

Figure 8:
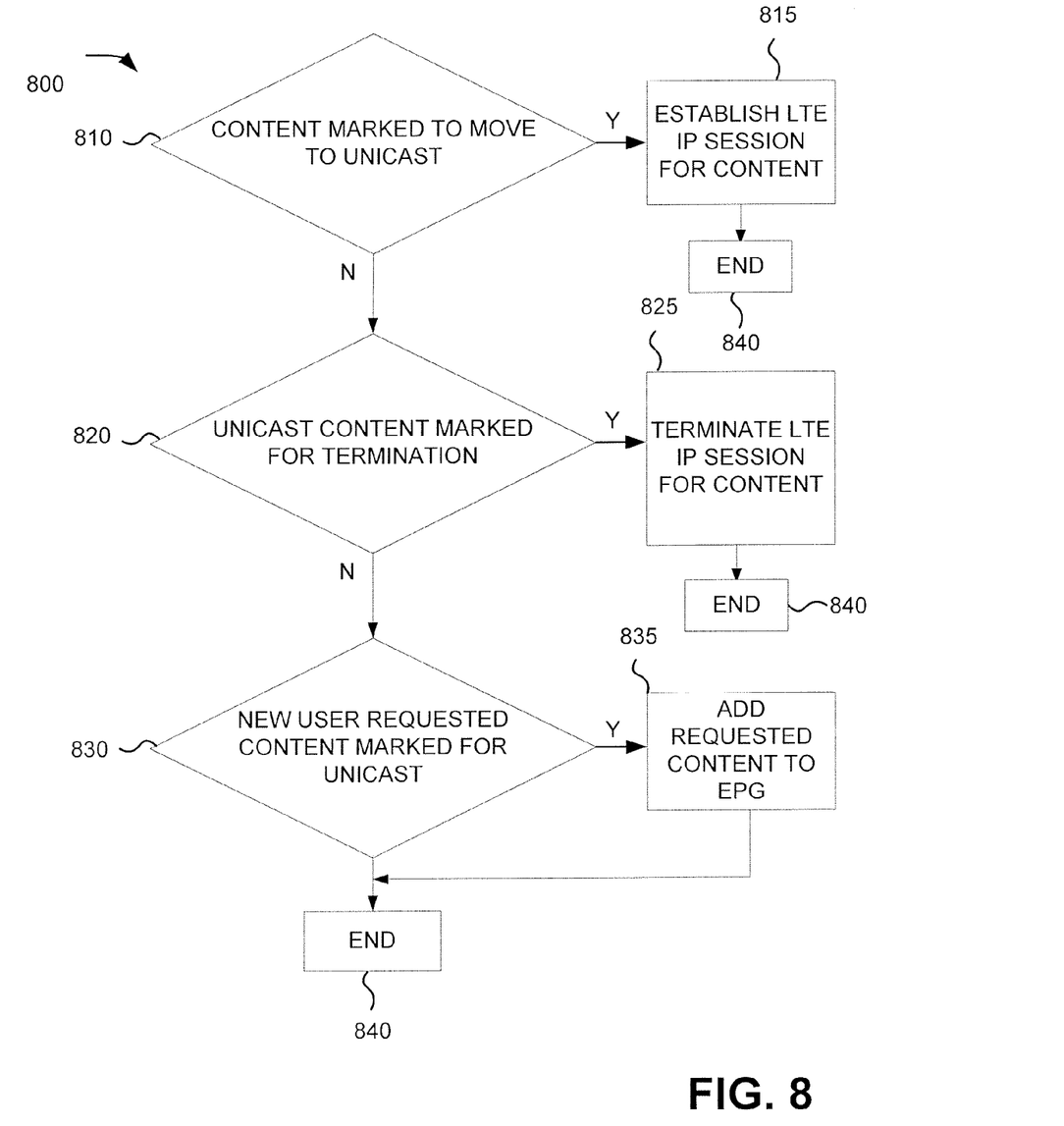
FIG. 8 is a flow-chart diagram of an example process executed by the content source in response to data provided by the reporting server and the BVPS.

FIG. 8 is a flow-chart diagram of an example process 800 executed by the content source 245 in response to data provided by the reporting server 265 and signals provided by the BVPS 253. This process may be activated for each content item in the ranked list. As described above, the reporting server 265 may mark one or more unicast content items that are to be terminated, the reporting server 265 and the BVPS 253 may indicate that one or more content items are to be switched from broadcast to unicast. If the reporting server 265 has marked any items to be switched from broadcast to unicast (block 810), the content source 245 establishes an LTE session via PGW 240, SGW 230 and base station 220 with the UE device or devices 210 receiving the content item or items (block 815). After block 815, the process ends for this content item (block 840). Next, if any unicast sessions are marked to be terminated either because there is insufficient demand for the content item or because the content item is being switched from unicast to broadcast (block 820), the content source 245 terminates the LTE IP session (block 825) and the process ends for this content item (block 840). If any of the content now being unicast is new (block 830), e.g. was not previously broadcast and was requested by one of the UE devices, it is added to the EPG (block 835). The process 800 terminates at block 840.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   sending, by a reporting server to a plurality of user equipment (UE) devices via a network, respective survey requests for multimedia content currently being accessed by the plurality of UE devices, each survey request including a request to subjectively rate the multimedia content currently being accessed;
   receiving, by the reporting server and via the network, respective survey responses to the survey requests, the survey responses including indications of multimedia content items being accessed by the user equipment (UE) devices in a service venue served by the network and subjective ratings of the respective multimedia content items;
   determining, by the reporting server, for each multimedia content item being accessed, a number of UE devices that are accessing the multimedia content item and whether the multimedia content item is being unicast or broadcast;
   ranking, by the reporting server, the multimedia content items by the number of UE devices accessing each multimedia content item to generate a ranked list;
   modifying the ranking based on the respective subjective ratings of each multimedia content item to generate a modified ranked list;
   generating, based on the modified ranked list, a switch list of multimedia content items to switch between broadcast and unicast transmission based on positions of the multimedia content items in the modified ranked list;
   determining whether additional content items that are not currently being accessed may be unicast or broadcast;
   based on the entries in the modified ranked list, selecting the additional content items and adding the selected additional content items to the modified ranked list; and
   sending, by the reporting server, the modified ranked list and the switch list to a broadcast video provisioning system (BVPS) and to a content source.

2. The method of claim 1, wherein the sending of the survey request includes sending separate unicast survey requests to each of the UE devices.

3. The method of claim 1, wherein the sending of the survey request includes causing the survey request to be broadcast to all of the UE devices.

4. The method of claim 1, further comprising:
   determining, by the BVPS, an amount of available broadcast bandwidth; and
   switching, by the BVPS, selected ones of the multimedia content items currently being unicast to be broadcast based on the available broadcast bandwidth and the ranking of the selected multimedia content items in the modified ranked list, wherein the selected ones of the multimedia content items have higher ranking in the modified ranked list than other multimedia content items in the modified ranked list that are currently being unicast.

5. The method of claim 1, further comprising:
   switching, by the content source, selected ones of the multimedia content items currently being broadcast to be unicast based on the ranking of the selected multimedia content items in the modified ranked list, wherein the selected ones of the multimedia content items have lower ranking in the modified ranked list than other multimedia content items in the modified ranked list that are currently being broadcast.

6. The method of claim 5, further comprising:
   sending the modified ranked list to an electronic program guide (EPG) server to modify an EPG produced by the EPG server.

7. The method of claim 1, wherein the step of modifying the ranking includes:
   reducing the ranking of multimedia content items having poor ratings and increasing the ranking of multimedia content items having good ratings.

8. The method of claim 1, further comprising;
   delivering, by the content source, a first set of multimedia content items through the network to the UE devices coupled to communicate through the network, as unicast transmissions to UE devices;
   delivering, by the BVPS, a second set of multimedia content items through the network to UE devices coupled to communicate through the network, as broadcast transmissions to UE devices; and
   the BVPS stopping the delivery of one or more content items in the second set of multimedia content items when the switch list provided by the reporting server indicates that the one or more content items is to switch from broadcast to unicast transmission.

9. The method of claim 8, further comprising:
   the content server stopping the delivery of one or more content items in the first set of multimedia content items when the switch list indicates that the one or more content items is to switch from unicast to broadcast transmission.

10. A system comprising:
    a reporting server in a communications network serving a service venue, the reporting server including a processor, a first non-transitory computer readable medium including first instructions and a communications interface, wherein the first instructions cause the processor of the reporting server:
    to transmit queries to a plurality of user equipment (UE) devices in the service venue, wherein each queries causes one of the UE devices to identify multimedia content that the UE device is currently accessing and whether the accessed multimedia content is being received via a multicast or unicast transmission;
    to receive, via the communications interface of the reporting server, respective responses to the queries, each response identifying the multimedia content items being accessed by user equipment (UE) device in the service venue through the network and whether the content item is a broadcast content item or a unicast content item;
    to determine, for each multimedia content item and from the received responses, a number of UE devices that are accessing the multimedia content item and whether the multimedia content item is being unicast or broadcast;
    to rank the multimedia content items by the number of UE devices accessing each multimedia content item into a ranked list;
    to generate a switch list of multimedia content items to switch between broadcast and unicast transmission based on the positions of the multimedia content items in the ranked list; and
    to send the ranked list and the switch list to a broadcast video provisioning system (BVPS) server in the communications network; and the BVPS server including a processor, a second non-transitory computer readable medium including second instructions and a communications interface, wherein the second instructions cause the processor of the BVPS server:
to receive the ranked list and the switch list;
to determine broadcast bandwidth and unicast bandwidth needed to implement the switches between broadcast and unicast indicated in the switch list;
to dynamically adjust an allocated broadcast bandwidth and an allocated unicast bandwidth to accommodate the determined broadcast and unicast bandwidths; and
to switch multimedia content items currently being unicast to be broadcast based on the switch list.

11. The system of claim 10 further comprising:
a content source including a processor, a third non-transitory computer readable medium including third instructions and a communications interface;
wherein:
the first instructions cause the processor of the reporting server to send the ranked list and the switch list to the content source via the communications interface of the reporting server;
the third instructions cause the processor of the content source:
to switch selected ones of the multimedia content items currently being broadcast to be unicast based on the switch list.

12. The system of claim 10, wherein the first instructions further cause the processor of the reporting server:
to transmit separate unicast queries to each of the UE devices.

13. The system of claim 10, wherein the first instructions further cause the processor of the reporting server:
to cause the queries to be broadcast as a single query to all of the UE devices.

14. The system of claim 10, wherein the second instructions further cause the processor of the BVPS:
to determine an amount of available broadcast bandwidth; and
to switch multimedia content items currently being unicast to be broadcast based on available broadcast bandwidth and the switch list.

15. A system comprising:
a reporting server in a communications network, the reporting server including a processor, a first non-transitory computer readable medium including first instructions and a communications interface, the first instructions causing the processor of the reporting server:
to send, to a plurality of user equipment (UE) devices via a network, respective survey requests for information about multimedia content in an electronic program guide (EPG) provided to the UE devices connected to the network, each survey request including a request to identify multimedia content currently being accessed by the UE device, a request to identify whether the multimedia content is being received as a unicast or multicast transmission, a request to identify multimedia content in the EPG that a user of the UE device would like to access and a request to subjectively rate the multimedia content in the EPG;
to receive, via the communications interface of the reporting server, respective survey responses to the survey requests, the survey responses including indications of multimedia content items in the EPG that user of the user equipment (UE) devices are currently accessing or want to access, whether the currently accessed content is multicast or unicast and subjective ratings of the respective content items;
to determine, for each multimedia content item, a number of UE devices that are currently accessing or want to access the multimedia content item;
to rank the multimedia content items by the number of UE devices that are currently accessing or want to access each multimedia content item into a ranked list and by the respective ratings of each multimedia content item to generate a ranked list;
to modify the ranked list based on the respective subjective ratings of each multimedia content item to generate a modified ranked list;
to generate, based on the modified ranked list, a switch list of multimedia content items to switch between broadcast and unicast transmission based on positions of the multimedia content items in the ranked list;
to determine whether additional content items, not listed in the EPG, may be unicast or broadcast;
based on the entries in the modified ranked list, to select the additional content items and to add the selected additional content items to the modified ranked list; and
to send the modified ranked list and the switch list to a broadcast video provisioning system (BVPS) and to a content source.

16. The system of claim 15, further comprising:
the BVPS including a processor, a second non-transitory computer readable medium including second instructions and a communications interface, the second instructions causing the processor of the BVPS:
to receive the modified ranked list and the switch list from the reporting server via the communications interface of the BVPS;
to determine, by the BVPS, an amount of available broadcast bandwidth; and
to cause, by the BVPS, selected ones of the multimedia content items from the modified ranked list to be broadcast based on the available broadcast bandwidth and the switch list.

17. The system of claim 16, wherein:
the first instructions further cause the processor of the reporting server to send the modified ranked list and the switch list to a content source; and
the system further comprises:
the content source including a processor, a third non-transitory computer readable medium including third instructions and a communications interface, the third instructions causing the processor of the content source:
to receive the modified ranked list and the switch list from the reporting server via the communications interface of the reporting server; and
to unicast selected ones of the multimedia content items from the modified ranked list based on the switch list.

18. The system of claim 17, further comprising:
an EPG server including a processor, a fourth non-transitory computer readable medium including fourth instructions and a communications interface, the fourth instructions causing the processor of the EPG server to maintain, in the EPG, a listing of all of the content items available for access by the plurality of UE devices;
wherein the fourth instructions cause the processor of the EPG server:
to receive the modified ranked list from the reporting server;

to adjust the contents of the EPG based on the modified ranked list; and to transmit the EPG to the plurality of UE devices connected to the network.

* * * * *